G. EDME.
Cane and Umbrella Handles.
No. 150,945. Patented May 19, 1874.
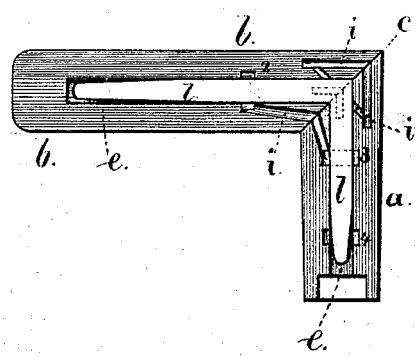
Fig. 1.
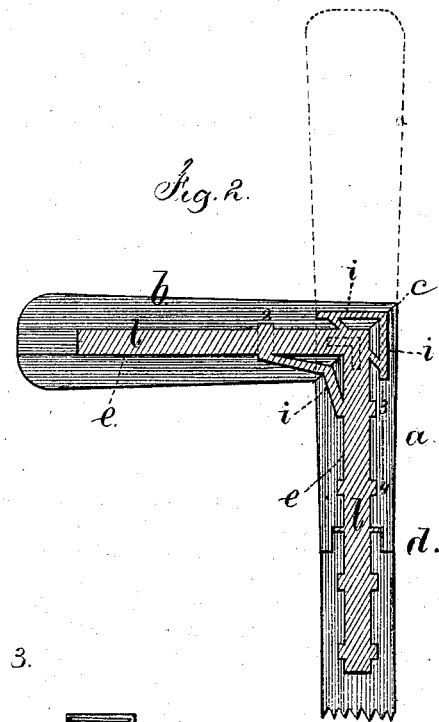
Fig. 2.
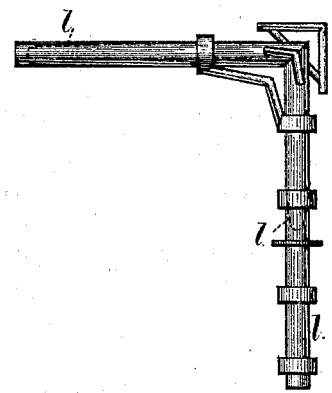
Fig. 3.
Fig. 4.
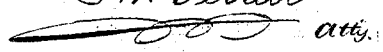

UNITED STATES PATENT OFFICE.

GEORGE EDME, OF NEW YORK, N. Y.

IMPROVEMENT IN CANE AND UMBRELLA HANDLES.

Specification forming part of Letters Patent No. 150,945, dated May 19, 1874; application filed October 28, 1873.

*To all whom it may concern:*

Be it known that I, GEORGE EDME, of the city and State of New York, have invented an Improvement in Handles of Walking-Canes, Umbrellas, &c., of which the following is a correct description:

Umbrella-handles and canes have been made with a crooked end, and in other instances with a hand-piece projecting at right angles from the stick, the parts being united by a miter-joint, and in some instances a screw has been employed at the miter-joint and the parts connected by glue or other adhesive material; but great difficulty has arisen in making the miter-joint strong and reliable under the strain to which it is exposed.

My invention relates to a means for uniting the parts at the miter-joint in the most firm and reliable manner.

In the drawing, Figure 1 illustrates the manner of preparing the handle for the reception of lead or other similar metal cast into the holes thereof. Fig. 2 is a section with the joint complete. Fig. 3 is a side view, and Fig. 4 is a plan, of the metal employed to unite the parts, the same being represented without the handle.

My improvement is available with wooden and other handles, where the hand-piece is of the same material as the stick, sawed off from the same by a diagonal cut and applied thereto at right angles. It may also be used with ivory or other heads or handles of umbrellas or canes.

The hand-piece $a$ and handle $b$ are brought together at right angles, or nearly so, by a diagonal or miter joint at $c$, and where the head is of a separate piece from the stick there will be a joint at $d$. The parts $a$ and $b$, while in line, as illustrated by dotted lines in Fig. 2, are to be bored with a central hole at $e$, and this hole may pass in from the end of $a$, as in Fig. 1, or from the end of $b$, as in Fig. 2. The parts are, by preference, sawed apart by the diagonal cut after this hole is bored. Two or more holes, $i$, are to be bored diagonally from the diagonal or miter faces into the holes $e$, and these holes $i$ are to be positioned so as to come opposite to each other when the parts $a$ and $b$ are set together. Collar-recesses may be formed in the holes $e$ by the use of an expansion-bit. Such collars and recesses are shown at 2 3 4. An angle-iron, $l$, is, by preference, inserted in the holes $e$, to hold the parts $a$ $b$ in position after the miter-surfaces are glued together, and while such adhesive material is setting or drying. The angle-iron $l$ is made of plate or sheet metal, so that the melted lead or similar metal flows freely at the sides thereof and fills the holes provided for it, and ties together firmly the parts $a$ $b$, and also connects the stick, if desired, when there is a joint at $d$, and the wires forming the connections cast in the holes $i$ aid in preventing the miter-joint separating or one part of the stick-handle turning at the joint upon the other.

I claim as my invention—

The method of securing the sections of umbrella and cane handles by means of the metallic connections at the joint cast in holes $e$ and $i$, substantially as set forth.

Signed by me this 24th day of October, A. D. 1873.

G. EDME.

Witnesses:
GEO. T. PINCKNEY,
CHAS. H. SMITH.